US009058586B2

(12) United States Patent
Chakra et al.

(10) Patent No.: US 9,058,586 B2
(45) Date of Patent: Jun. 16, 2015

(54) IDENTIFICATION OF A PERSON LOCATED PROXIMITE TO A CONTACT IDENTIFIED IN AN ELECTRONIC COMMUNICATION CLIENT

(75) Inventors: Al Chakra, Apex, NC (US); Liam Harpur, Skerries (IE); Mark Kelly, Skerries (IE); John Rice, Waterford (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 715 days.

(21) Appl. No.: 13/194,485

(22) Filed: Jul. 29, 2011

(65) Prior Publication Data

US 2013/0030682 A1     Jan. 31, 2013

(51) Int. Cl.
*G06F 15/16*     (2006.01)
*G06Q 10/10*    (2012.01)

(52) U.S. Cl.
CPC .............. *G06Q 10/10* (2013.01); *G06Q 10/107* (2013.01)

(58) Field of Classification Search
CPC ....... H04W 4/02; H04W 4/021; H04W 4/023; H04W 8/005; H04W 4/22; H04W 64/00; G06Q 10/107; H04M 2242/30; H04M 3/54; H04M 2203/2094; H04M 1/72536; H04M 1/72572; H04M 2250/10; H04M 3/58; H04L 51/14
See application file for complete search history.

(56) References Cited

U.S. PATENT DOCUMENTS

| | | | |
|---|---|---|---|
| 5,412,738 A | 5/1995 | Brunelli et al. | |
| 5,724,481 A | 3/1998 | Garberg et al. | |
| 2005/0044143 A1 | 2/2005 | Zimmermann et al. | |
| 2008/0133697 A1 * | 6/2008 | Stewart et al. | 709/217 |
| 2008/0194270 A1 * | 8/2008 | Greenberg | 455/456.1 |
| 2009/0074258 A1 * | 3/2009 | Cotgreave | 382/118 |
| 2009/0175509 A1 | 7/2009 | Gonion et al. | |
| 2009/0280818 A1 * | 11/2009 | Chavez et al. | 455/445 |
| 2010/0190479 A1 * | 7/2010 | Scott et al. | 455/414.1 |
| 2010/0241714 A1 * | 9/2010 | Aono et al. | 709/206 |
| 2012/0207294 A1 * | 8/2012 | Katpelly et al. | 379/201.02 |
| 2012/0214449 A1 * | 8/2012 | Jordan et al. | 455/414.1 |
| 2013/0012175 A1 * | 1/2013 | Butterfield et al. | 455/414.1 |
| 2013/0065609 A1 * | 3/2013 | Fish | 455/456.1 |
| 2014/0065997 A1 * | 3/2014 | Walker et al. | 455/404.1 |

* cited by examiner

*Primary Examiner* — Dustin Nguyen
*Assistant Examiner* — Hao Nguyen
(74) *Attorney, Agent, or Firm* — Cuenot, Forsythe & Kim, LLC

(57) ABSTRACT

A method, which includes, within an electronic communication client, identifying a first person. Via a processor, at least a second person geographically located proximate to a geographic location associated with the first person can be identified. The method further can include, within the electronic communication client, indicating that the second person is geographically located proximate to the geographic location associated with the first person.

18 Claims, 4 Drawing Sheets

IDENTIFICATION OF A PERSON LOCATED PROXIMITE TO A CONTACT IDENTIFIED IN AN ELECTRONIC COMMUNICATION CLIENT

BACKGROUND

One or more embodiments disclosed within this specification relate to electronic communications.

The use of electronic communication, such as instant messaging, text messaging and electronic mail email), is commonplace throughout much of the world. Indeed, electronic communication has become a part of everyday life in industrialized countries. An electronic communication usually is directed to a recipient's personal communication device, such as the recipient's computer or mobile telephone.

Unlike a conventional telephone call in which the parties are simultaneously on the call, two parties to a text messaging or email session can respond to each other at their convenience. For example, a first user may receive a text message from a second user while the first user is presently busy with another task, The first user can ignore the text message until a later time, and respond when it is more convenient to do so. With instant messaging, however, it is typically expected that a prompt response will be provided, assuming the contacted party is presently available.

BRIEF SUMMARY

One or more embodiments disclosed within this specification relate to electronic communications and, more particularly, to identification of a person located proximate to a contact identified in an electronic communication client.

An embodiment can include a method, which includes, within an electronic communication client, identifying a first person. Via a processor, at least a second person geographically located proximate to a geographic location associated with the first person can be identified. The method further can include, within the electronic communication client, indicating that the second person is geographically located proximate to the geographic location associated with the first person.

Another embodiment can include a system that includes a computer-readable storage medium having computer-readable program code embodied therewith. The system also can include a processor coupled to the computer-readable storage medium, wherein responsive to executing the computer-readable program code, the processor is configured to perform executable operations. The executable operations can include, within an electronic communication client, identifying a first person. At least a second person geographically located proximate to a geographic location associated with the first person can be identified. The executable operations further can include, within the electronic communication client, indicating that the second person is geographically located proximate to the geographic location associated with the first person.

Another embodiment can include a computer program product including a computer-readable storage medium having computer-readable program code embodied therewith to perform the various steps and/or functions disclosed within this specification.

DETAILED DESCRIPTION

Figure 1:
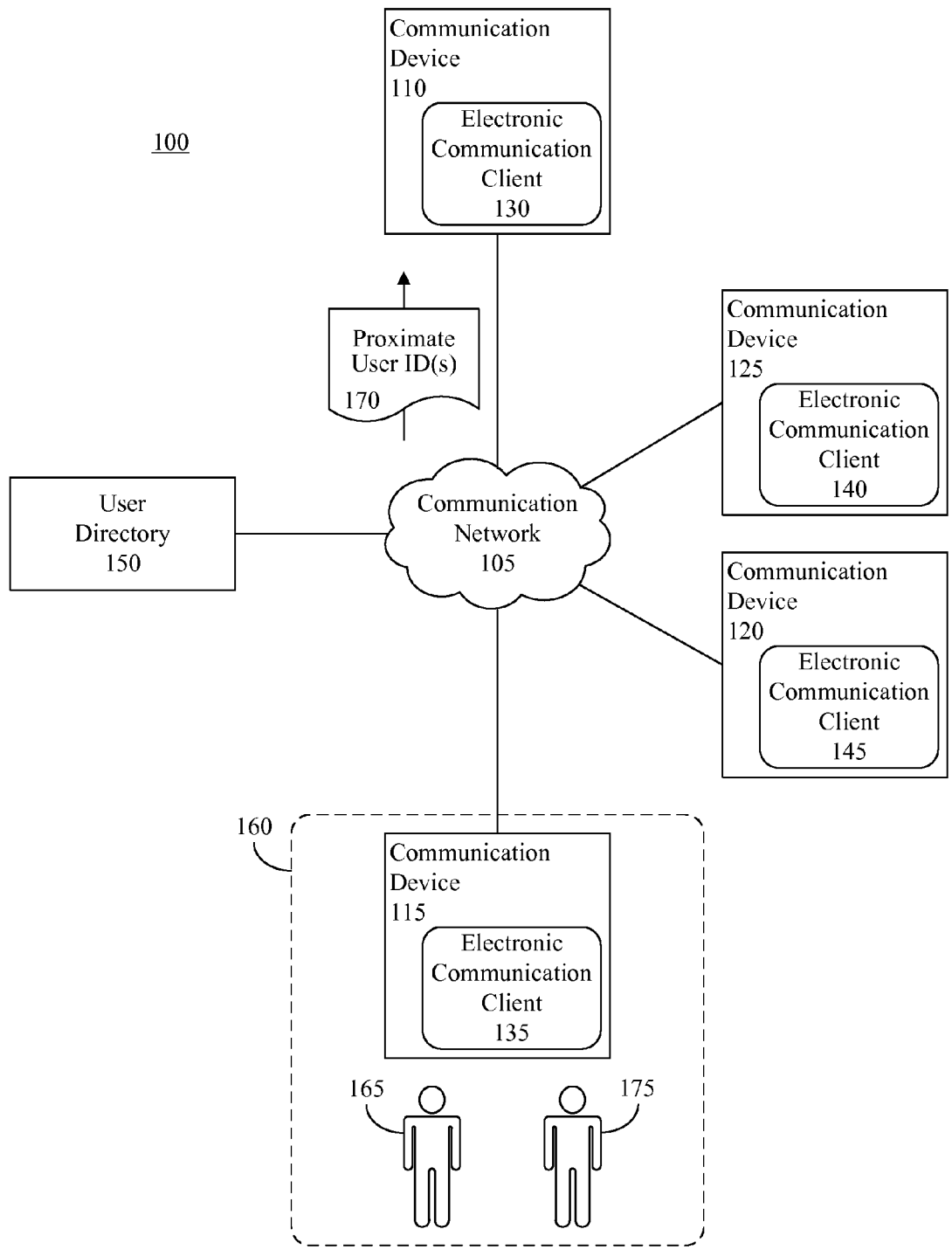
FIG. 1 is a block diagram illustrating a system in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium.(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires; a portable computer diskette; a hard disk drive (HDD), a solid state drive (SSD), a random access memory (RAM), a read-only memory (ROM), an erasable programmable read-only memory (EPROM or Hash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention relates to, within an electronic communication client, identifying a first person and one or more people geographically located proximate to a geographic location associated with the first person. Within the electronic communication client, an indication can be provided to a user to indicate that the second person is geographically located proximate to the first person. For example, an identifier associated with the second person can be presented proximate to an identifier associated with the first person within a view of the communication client. Accordingly, the user can be notified as to other people who are proximate to the first person when sending communications to, or receiving communications from, the first person. Moreover, when the first person does not appear to be presently located at a geographic location where expected, for example in the first persons work area, the user can contact the second person. The second person may provide assistance to help the user get in contact with the first person.

FIG. 1 is a block diagram illustrating a system 100 in accordance with one embodiment of the present invention. The system 100 van include a plurality of communication devices 110, 115, 120, 125 communicatively linked via a communication network 105. The communication network 105 can comprise a WAN (e.g., the Internet), a LAN, a cellular communication system, or any other suitable system or systems via which communication devices may be communicatively linked. The communication devices 110-125 can be computers (e.g., desktop computers, laptop computers, notebook computers, netbook computers, tablet computers, etc.), personal digital assistants (PDAs), mobile telephones, or any other devices that support electronic communications. Respective electronic communication clients (hereinafter "EC clients") 130, 135. 140, 145 can be installed on the communication devices 110-125. The EC clients 130-145 can be, for example, instant messaging (IM) clients, text messaging clients or electronic mail (email) clients. The system 100 further can include a user directory 150 accessible to one or more of the communication devices 110-125 via the communication network 105. The user directory 150 can indicate a present geographic location and/or an expected geographic location of each of a plurality of users. The user directory 150 can be, for example, a business directory.

The communication device 115 can be located in a geographic region 160 associated with a person 165. The geographic region 160 can be a geographic location where the person 165 is presently located, or a geographic location where the person 165 is expected to be located. For example, the geographic region 160 can be an office, a cubicle or a workstation where the person 165 typically visits (e.g., where the first person 165 works).

In operation, the EC client 135 can communicate to the EC client 13 one or more messages 170 indicating user identifiers for people, such as a person 175, who are geographically located proximate to a geographic location associated with the person 165. In illustration, when the person 175 is located within the geographic region 160, the message 170 can include a user identifier associated with the person 175.

A determination that the person 175 is geographically located proximate to a geographic location associated with the person 165 can be made in any suitable manner. For example, the communication device 115 can include a camera that captures visual data, such as still images and/or video. An image processing application (not shown) can process visual data captured by the communication device 115 and identify people whose images are contained in the visual data. In illustration, the user directory 150 can include image data for a plurality of people, for instance within a database. The image processing application can access such image data and compare the captured visual data to the image data in order to identify the person 175 whose image data matches an image contained in the visual data. If present, the person 165 also can be identified, as well as any other people whose images are contained in the visual data.

In another embodiment, the communication device 115 can include an input audio transducer (e.g., a microphone) that captures audio data. An audio processing application (not shown) can process audio data captured by the communication device 115 and identify people whose voices are contained in the audio. In illustration, the user directory 150 can include audio data (e.g., voice data) fir a plurality of people, for instance within a database. The image processing application can access such audio data. and compare the captured audio to the audio data in order to identify the person 175 whose voice matches a voice contained in the captured audio. If present, the person 165 also can be identified, as well as any other people whose voices are contained in the captured audio.

In another aspect, rather than the EC client 135 communicating the message 170 to the EC client 130, the EC client 130 can access the user directory 150 to retrieve user identifiers for people who are geographically located proximate to a geographic location associated with the person 165. In illustration, the user directory 150 can include location information associated with the users identified in the user directory 150, including the person 165 and the person 175. Based on the location information, the EC client 130 can determine that the person 175 is geographically located proximate to a geographic location associated with the person 165. In illustration, the EC client 130 can compare the respective locations associated with the person 165 and the person 175 to determine whether such locations are at least proximate to one another, or whether the person 165 and the person 175 are associated with same location, for example the geographic region 160.

Some people may not wish to be identified as described above. Such people can opt out of the identification scheme. For example, user preferences or administration settings can be set in the user directory 150 to indicate whether users can be identified as being located proximate to a geographic location associated with another person. Further options may be provided to limit the identification to certain users or classes of users. For example, user preferences or administration settings can be set so that the location of the person 175 is only indicated to EC clients 130-145 associated with management personnel. Accordingly, a determination can be made that preferences associated with the person 175 indicate an authorization to identify within the EC client 130 that the person 175 is geographically located proximate to the geographic location associated with the person 165. If such authorization is indicated, the identification can be provided within the EC client 130. If such authorization is not indicated, the identification can be prevented.

Figure 2:
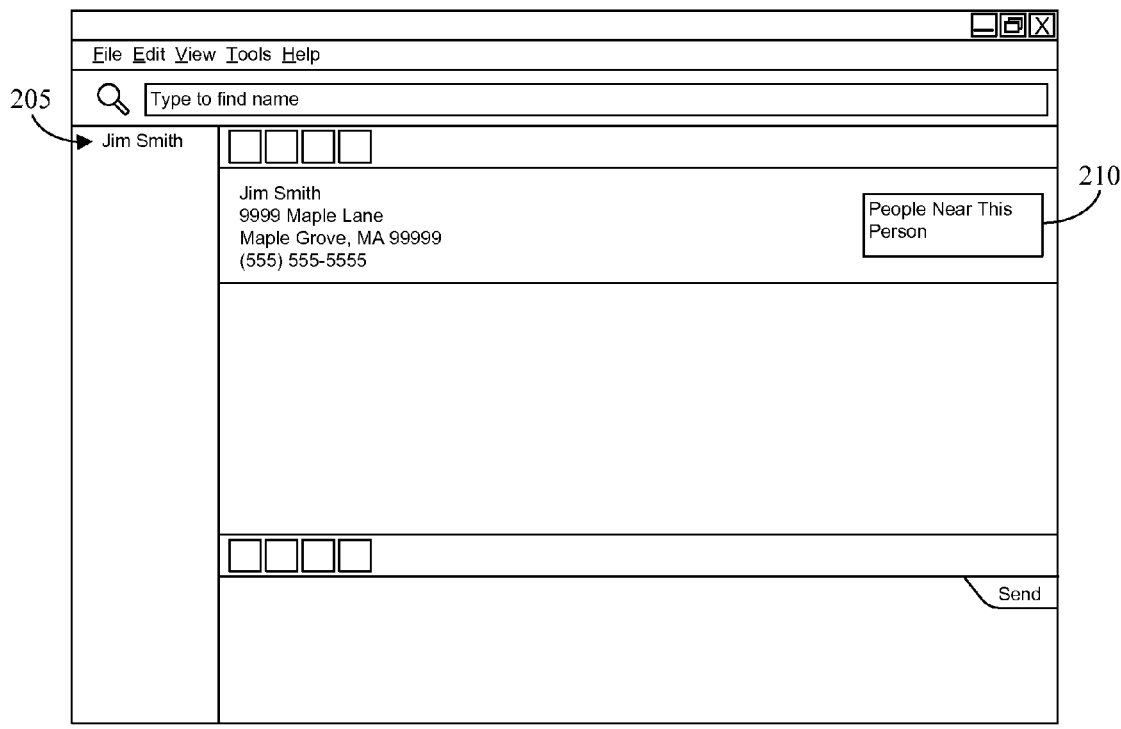
FIG. 2 is a view presented in an electronic communication client in accordance with one embodiment of the present invention.
Figure 3:
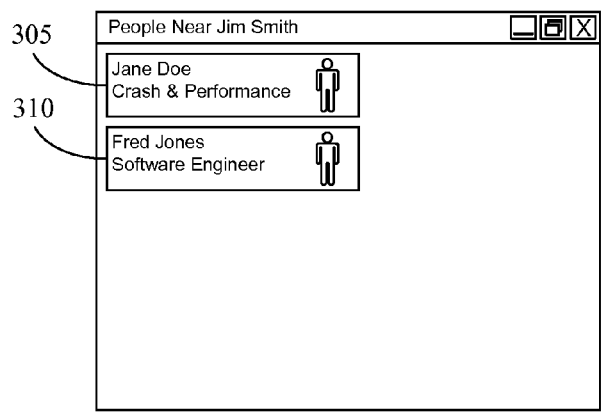
FIG. 3 is a view presented in an electronic communication client accordance with one embodiment of the present invention.

FIG. 2 is a view 200 presented in an EC client in accordance with one embodiment of the present invention. Within the view 200, a user can select a contact 205 (i.e., a person). The contact 205 can be selected from a list of contacts, selected from a message that is received, or selected from a message that is sent. A selectable object 210, such as a button or icon, can be presented within the view 200. When the object 210 is selected, for example via a cursor, people who are geographically located proximate to a geographic location associated with the contact 205 can be identified. In illustration, a view 300 depicted in FIG. 3 can be presented in the EC client. In the view 300, a contact identifier 305 representing the contact 205 can be presented. In addition, an identifier 310 can be presented in the view for a person who is geographically located proximate to the geographic location associated with the contact 205. If additional other persons are geographically located proximate to the geographic location associated with the contact 205, identifiers representing such contacts also can be presented in the view 300. Presenting the contact identifiers 305, 310 within the view 300 can indicate that the person associated with the contact identifier 310 is geographically located proximate to the geographic location associated with the contact 205. In one aspect, the contact identifier 310 can be presented proximate to the contact identifier 305.

Advantageously, the present invention provides a means for a user to ascertain who else is located proximate to an electronic communication recipient's geographic location prior to sending an electronic communication to the recipient. Similarly, if a user receives an electronic communication from a sender, the user can ascertain who else is proximate to the geographic location associated with the sender, For example, an indication of who is proximate to the geographic location can be provided in response to receiving an electronic communication from the sender. A further advantage provided by the identification of people located proximate to a contact's geographic location is that one or more of such people may be contacted to relay a message to the contact if the contact presently is unavailable. For example, if the contact is away from his desk, someone working proximate to the contact's desk may be contacted.

Figure 4:
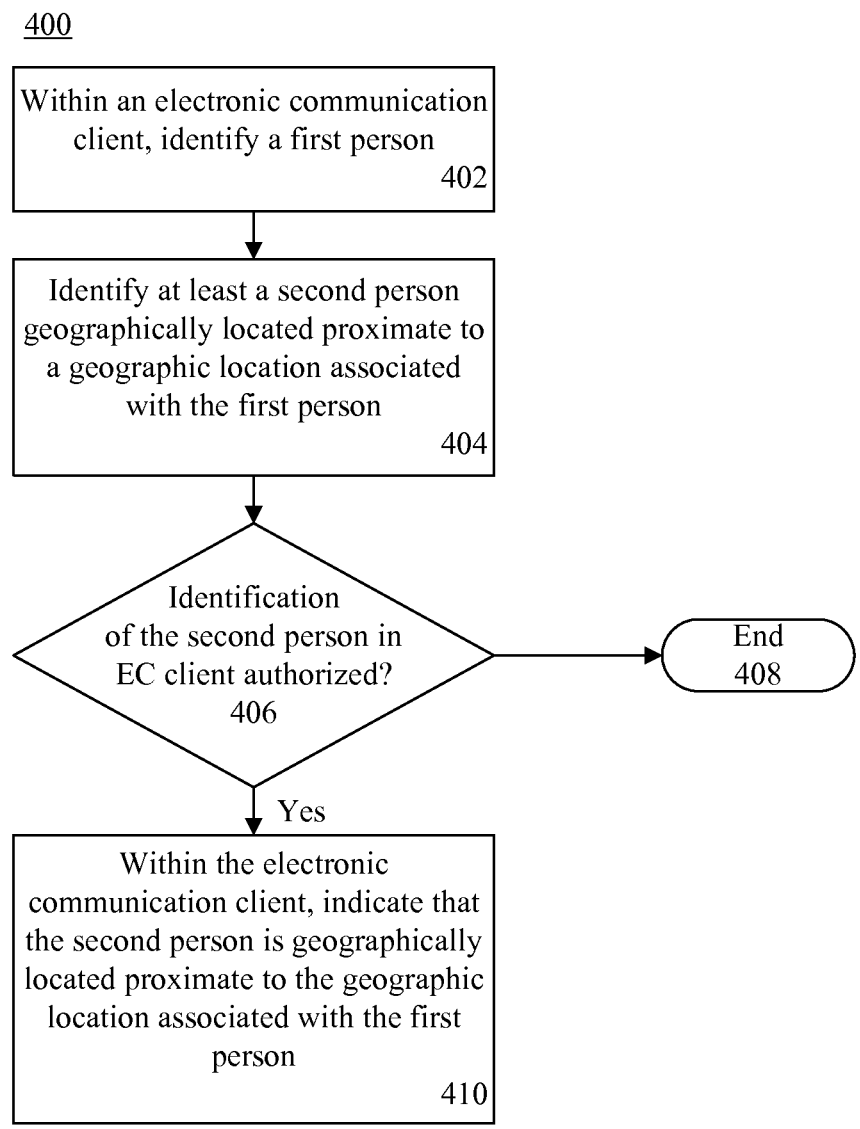
FIG. 4 is a flow chart illustrating a method in accordance with another embodiment of the present invention.

FIG. 4 is a flow chart illustrating a method 400 in accordance with another embodiment of the present invention. At step 402, within an EC client, a first person can be identified. At step 404, at least a second person geographically located proximate to a geographic location associated with the first person can be identified. The second person can be identified by analyzing visual data or audio data captured at the expected location, and identifying the second person in the visual data or the audio data. In another arrangement, the second person can be identified by identifying within a directory a geographic location associated with the second person.

At decision box 406, a determination can be made whether identification of the second person in the EC client is authorized, Such determination can be based on user preferences, administrative settings, or the like. If identification of the second person is not authorized, the process can end at step 408. If identification of the second. person is authorized, the process can proceed to step 410. At step 410, within the EC client, an indication can be provided that the second person is geographically located proximate to the geographic location associated with the first person.

Figure 5:
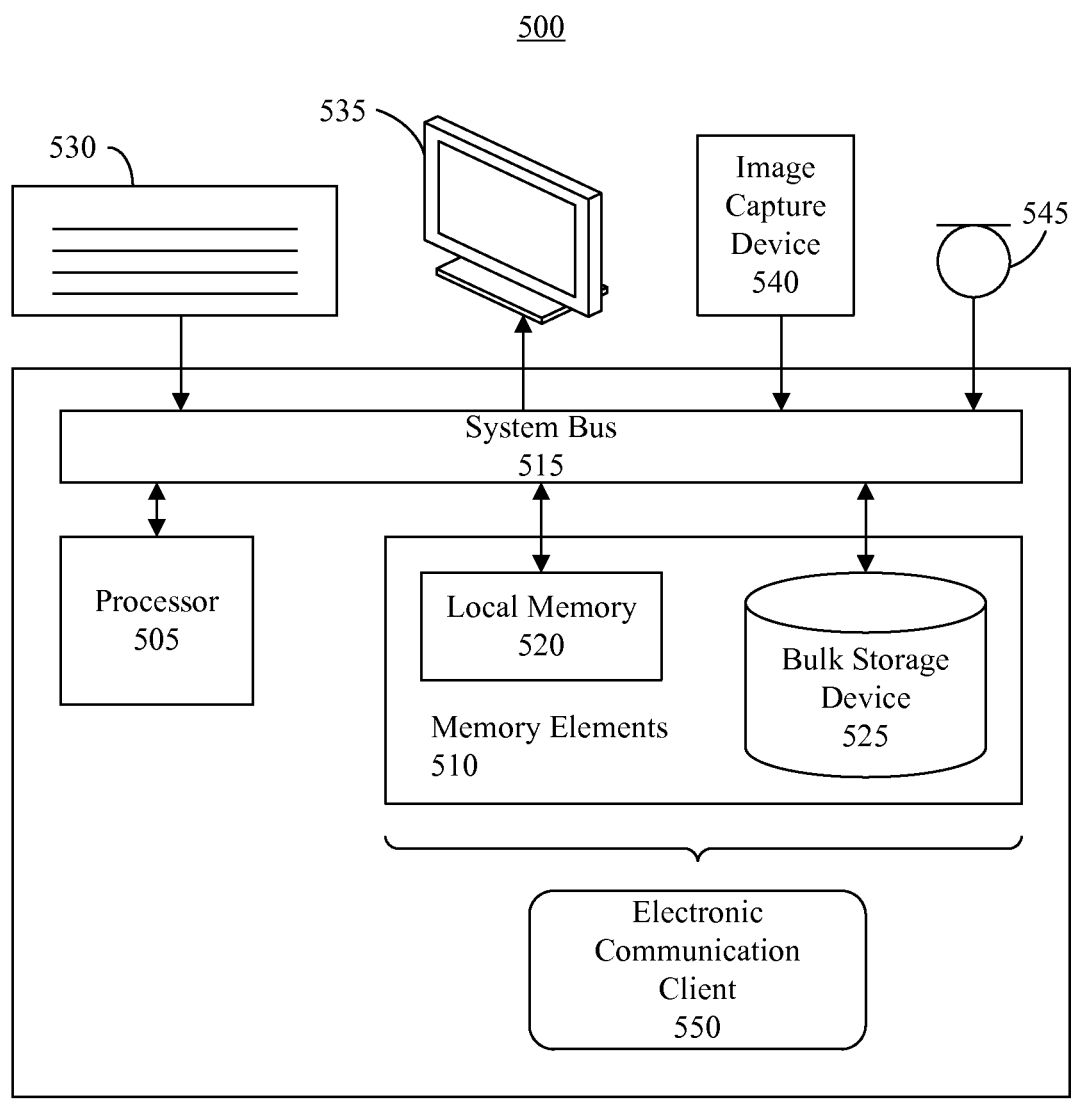
FIG. 5 is a block diagram illustrating a communication device in accordance with another embodiment of the present invention.

FIG. 5 is a block diagram illustrating a communication device 500 in accordance with another embodiment of the present invention, The communication device 500 can include at least one processor 505 coupled to memory elements 510 through a system bus 515. As such, the communication device 500 can store program code within the memory elements 510. The processor 505 can execute the program code accessed from the memory elements 510 via system bus 515. In one aspect, for example, the communication device 500 can be implemented as computer that is suitable for storing and/or executing program code, It should be appreciated, however, that the communication device 500 can be implemented in the form of any system comprising a processor and memory that is capable of performing the functions described within this specification.

The memory elements 510 can include one or more physical memory devices such as, for example, local memory 520 and one or more bulk storage devices 525. Local memory 520 refers to random access memory or other non-persistent memory device(s) generally used during actual execution of the program code, Bulk storage device(s) 525 can be implemented as a hard disk drive, solid state drive, or other persistent data storage device. The communication device 500 also can include one or more cache memories (not shown) that provide temporary storage of at least some program code in order to reduce the number of times program code must be retrieved from the bulk storage device 525 during execution.

Input/output WO) devices such as a keyboard 530, a display 535, an image capture device 540 a camera) that captures visual data, an input audio transducer 545 that captures audio data, and a pointing device (not shown) optionally can be coupled to the communication device 500, The I/O devices can be coupled to the communication device 500 either directly or through intervening I/0 controllers. Network adapters also can be coupled to the communication device 500 to enable the communication device 500 to become coupled to other systems, computer systems, remote printers, and/or remote storage devices through intervening private or public networks. Modems, cable modems, and Ethernet cards are examples of different types of network adapters that can be used with the communication device 500.

As pictured in FIG. 5, the memory elements 510 can store an EC client 550. The EC client 550, being implemented in the form of executable program code, can be executed by the communication device 500 to implement the methods, processes and functions described herein. In this regard, the communication device 500 represents one embodiment of the communication devices 110-125 depicted in FIG. 1.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the terms "user,", "contact," "sender," and "recipient" all refer to a person. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method comprising:
within an electronic communication client, receiving from a third person at least one user input identifying a first person;
responsive to receiving the at least one user input, via a processor, receiving audio data captured at a geographic location assigned to the first person, identifying a voice of at least a second person in the audio data, accessing a user directory indicating a present geographic location or an expected geographic location of each of a plurality of users and, in the user directory, automatically determining that the second person is geographically located proximate to a geographic location assigned to the first person; and
within the electronic communication client, indicating to the third person that the second person is geographically located proximate to the geographic location assigned to the first person.

2. The method of claim 1, wherein indicating that the second person is geographically located proximate to the geographic location assigned to the first person comprises:
presenting, in the electronic communication client, a first contact identifier representing the first person; and
presenting, in the electronic communication client and proximate to the first contact identifier, a second contact identifier representing the second person.

3. The method of claim 1, further comprising:
receiving visual data captured at the geographic location assigned to the first person; and
via the processor, identifying an image of the second person in the visual data.

4. The method of claim 1, further comprising:
determining that preferences associated with the second person indicate an authorization to identify within the electronic communication client that the second person is geographically located proximate to the geographic location assigned to the first person.

5. The method of claim 1, further comprising:
receiving an electronic message from the first person, the electronic message selected from a group consisting of an instant message, a text message and an email;
wherein the second person is indicated as being geographically located proximate to the geographic location assigned to the first person in response to receiving the electronic message from the first person.

6. The method of claim 1, further comprising:
receiving a user selection of the first person from a list of contacts within the electronic communication client;
wherein the second person is indicated as being geographically located proximate to the geographic location assigned to the first person in response to receiving the user selection of the first person from the list of contacts.

7. A system comprising:
a computer-readable storage medium having computer-readable program code embodied therewith;
a processor coupled to the computer-readable storage medium, wherein responsive to executing the computer-readable program code, the processor is configured to perform executable operations comprising:
within an electronic communication client, receiving from a third person at least one user input identifying a first person;
responsive to receiving the at least one user input, receiving audio data captured at a geographic location assigned to the first person, identifying a voice of at least a second person in the audio data, accessing a user directory indicating a present geographic location or an expected geographic location of each of a plurality of users and, in the user directory, automatically determining that the second person is geographically located proximate to a geographic location assigned to the first person; and within the electronic communication client, indicating to the third person that the second person is geographically located proximate to the geographic location assigned to the first person.

8. The system of claim 7, wherein indicating that the second person is geographically located proximate to the geographic location assigned to the first person comprises:
presenting, in the electronic communication client, a first contact identifier representing the first person; and
presenting, in the electronic communication client and proximate to the first contact identifier, a second contact identifier representing the second person.

9. The system of claim 7, the executable operations further comprising:
receiving visual data captured at the geographic location assigned to the first person; and
via the processor, identifying an image of the second person in the visual data.

10. The system of claim 7, wherein the executable operations further comprise:
determining that preferences associated with the second person indicate an authorization to identify within the electronic communication client that the second person is geographically located proximate to the geographic location assigned to the first person.

11. The system of claim 7, wherein the executable operations further comprise:
receiving an electronic message from the first person, the electronic message selected from a group consisting of an instant message, a text message and an email;
wherein the second person is indicated as being geographically located proximate to the geographic location assigned to the first person in response to receiving the electronic message from the first person.

12. The system of claim 7, wherein the executable operations further comprise:
receiving a user selection of the first person from a list of contacts within the electronic communication client;
wherein the second person is indicated as being geographically located proximate to the geographic location assigned to the first person in response to receiving the user selection of the first person from the list of contacts.

13. A computer program product comprising:
a computer-readable memory having computer-readable program code embodied therewith, the computer-readable program code comprising:
computer-readable program code configured to, within an electronic communication client, receive from a third person at least one user input identifying a first person;
computer-readable program code configured to, responsive to receiving the at least one user input, receive audio data captured at a geographic location assigned to the first person, identify a voice of at least a second person in the audio data, access a user directory indicating a present geographic location or an expected geographic location of each of a plurality of users and, in the user directory, automatically determine that the second person is geographically located proximate to a geographic location assigned to the first person; and
computer-readable program code configured to, within the electronic communication client, indicate to the third person that the second person is geographically located proximate to the geographic location assigned to the first person.

14. The computer program product of claim 13, wherein the computer-readable program code configured to indicate that the second person is geographically located proximate to the geographic location assigned to the first person comprises:
computer-readable program code configured to present, in the electronic communication client, a first contact identifier representing the first person; and
computer-readable program code configured to present, in the electronic communication client and proximate to the first contact identifier, a second contact identifier representing the second person.

15. The computer program product of claim 13, wherein the computer-readable program code further comprises:
computer-readable program code configured to receive visual data captured at the geographic location assigned to the first person; and
computer-readable program code configured to identify an image of the second person in the visual data.

16. The computer program product of claim 13, further comprising:
computer-readable program code configured to determine that preferences associated with the second person indicate an authorization to identify within the electronic communication client that the second person is geographically located proximate to the geographic location assigned to the first person.

17. The computer program product of claim 13, further comprising:
computer-readable program code configured to receive an electronic message from the first person, the electronic message selected from a group consisting of an instant message, a text message and an email;
wherein the second person is indicated as being geographically located proximate to the geographic location assigned to the first person in response to receiving the electronic message from the first person.

18. The computer program product of claim 13, further comprising:
computer-readable program code configured to receive a user selection of the first person from a list of contacts within the electronic communication client;
wherein the second person is indicated as being geographically located proximate to the geographic location assigned to the first person in response to receiving the user selection of the first person from the list of contacts.

* * * * *